US006548761B1

(12) United States Patent
Wang

(10) Patent No.: US 6,548,761 B1
(45) Date of Patent: Apr. 15, 2003

(54) ONE-WAY CABLE TERMINAL CONNECTOR

(76) Inventor: Jen-Ching Wang, No. 27, Alley 4, Lane 446, Fu Hsin Rd., Shu Lin Chen, Taipei County (TW)

( * ) Notice: Subject to any disclaimer, the term of this patent is extended or adjusted under 35 U.S.C. 154(b) by 68 days.

(21) Appl. No.: 09/925,453

(22) Filed: Aug. 10, 2001

(51) Int. Cl.[7] ........................ H02G 15/02; H02G 15/08; H01R 4/00; H01R 11/20

(52) U.S. Cl. ..................... 174/74 R; 174/78; 174/84 R; 174/93; 439/441

(58) Field of Search ............................ 174/84 R, 74 R, 174/74 A, 75 F, 76, 77 R, 78, 80, 82, 93; 439/440, 441, 439, 438

(56) References Cited

U.S. PATENT DOCUMENTS 3,736,548 A * 5/1973 Double ........................ 439/166
4,176,898 A * 12/1979 Marechal .................... 439/139
4,630,876 A * 12/1986 Grunberg et al. ........... 439/293
5,440,073 A * 8/1995 Lin et al. .................. 174/74 R
5,847,320 A * 12/1998 Fisher ......................... 174/87
6,444,914 B1 * 9/2002 Su ........................... 174/84 R

FOREIGN PATENT DOCUMENTS

GB 2241386 A * 8/1991 .......... H02G/15/18

* cited by examiner

*Primary Examiner*—Dean A. Reichard
*Assistant Examiner*—William H Mayo, III
(74) *Attorney, Agent, or Firm*—Varndell & Varndell, PLLC

(57) ABSTRACT

A one-way cable terminal connector includes a connector base having a crossed open chamber and an upright post in the open chamber, two V-shaped metal spring plates respectively coupled to the upright post in the open chamber, each spring plate having a retaining end piece adapted to hold down the core of a respective cable being inserted into the connector base, and a metal column fixedly fastened to the upright post to secure the spring plates in place for contacting and supporting the core of inserted cables.

5 Claims, 9 Drawing Sheets

ONE-WAY CABLE TERMINAL CONNECTOR

BACKGROUND OF THE INVENTION

The present invention relates to electric connectors and, more specifically, to a one-way cable terminal connector.

U.S. Pat. No. 6,093,052 discloses a two-way cable terminal connector design. This cable terminal connector design is practical for use to connect the cores of cables in two directions, however it is not suitable for connecting the cores of cables in one direction.

SUMMARY OF THE INVENTION

The present invention has been accomplished under the circumstances in view. It is one object of the present invention to provide a cable terminal connector, which is practical for connecting the cores of cables in one direction. It is another object of the present invention to provide a one-way cable terminal connector, which is easy to install. According to one aspect of the present invention, the one-way cable terminal connector comprises a connector base having a crossed open chamber and an upright post in the open chamber, two V-shaped metal spring plates respectively coupled to the upright post in the open chamber, each spring plate having a retaining end piece adapted to hold down the core of a respective cable being inserted into the connector base, and a metal column fixedly fastened to the upright post to secure the spring plates in place for contacting and supporting the core of inserted cables. According to another aspect of the present invention, the metal column has the four peripheral sidewalls respectively transversely curved inwards, and the end piece of each arm of each of the metal spring plates has a smoothly arched end notch matching the inwardly curved peripheral sidewalls of the metal column for easy insertion of the cores of cables into position. According to still another aspect of the present invention, a cover plate is fastened to the connector base for dust protection. The cover plate has bottom plugs respectively press-fitted into respective plug holes in the connector base, and insertion holes for the passing of cables.

DETAILED DESCRIPTION OF THE PREFERRED EMBODIMENT

Figure 5:
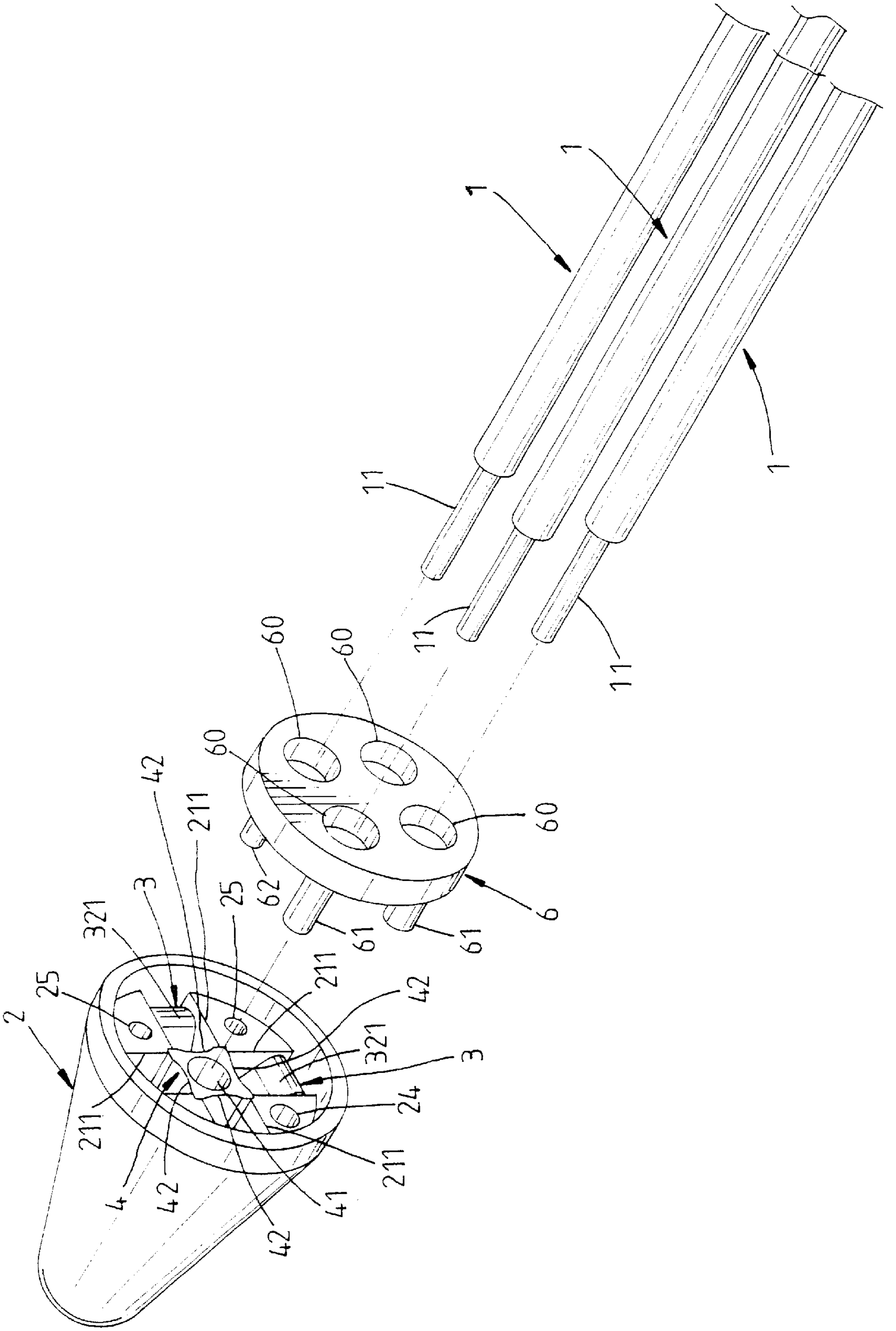
FIG. 5 is an exploded view of the one-way cable terminal connector and the cables according to the present invention.
Figure 6:
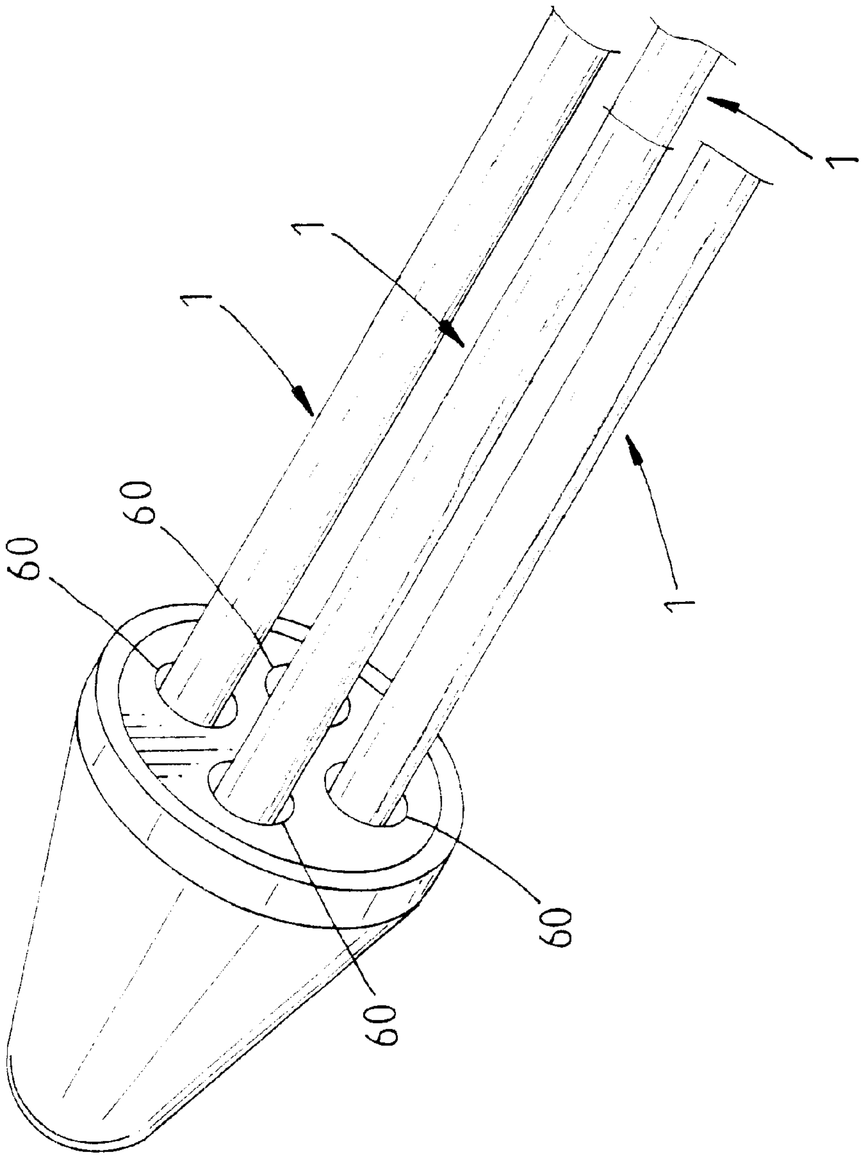
FIG. 6 is an assembly view of FIG. 5.
Figure 7:
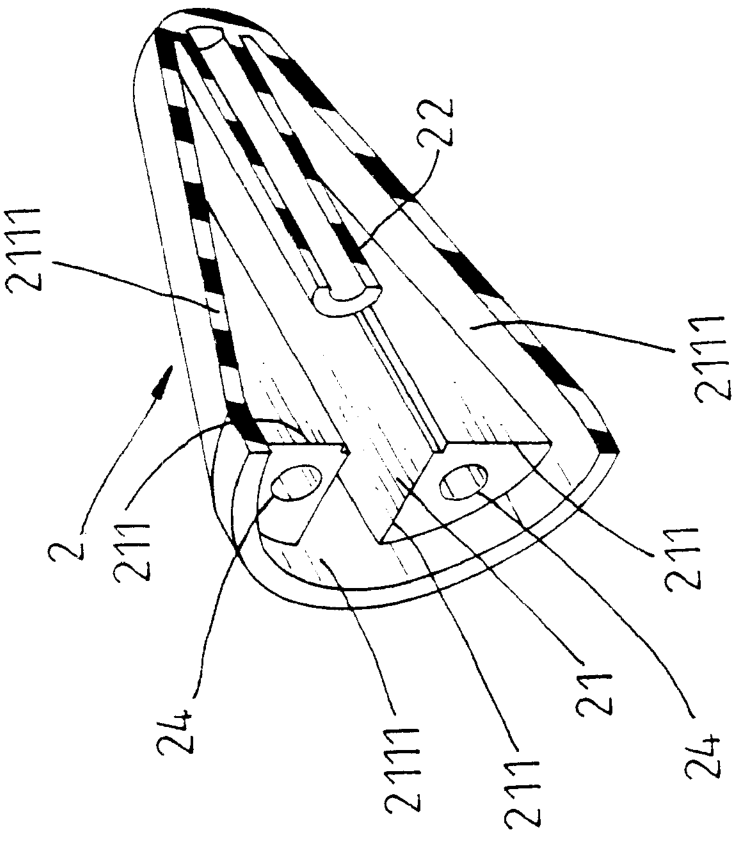
FIG. 7 is a sectional elevation of the connector base for the one-way cable terminal connector according to the present invention.

Referring to Figures from 1 through 7, a one-way cable terminal connector is shown adapted to receive the cores 11 of electric cables 1 in one way. The one-way cable terminal connector is comprised of an electrically insulative connector base 2, two metal substantially V-shaped metal spring plates 3, a metal column 4, a metal screw rod 5, and an electrically insulative cover plate 6. The connector base 2 comprises a crossed open chamber 21, an upright locating post 22 provided at the center of the crossed open chamber 21 (see FIG. 7), and a plurality of plug holes 24;25 respectively disposed in four corners around the crossed open chamber 21 and extended in direction parallel to the upright post 22. The crossed open chamber 21 is formed of four spaces 211 extended in four directions, and a tapered periphery 2111 surrounding the four spaces 211. The metal spring plates 3 are arranged at right angles and coupled to the upright post 22 in the crossed open chamber 21 of the connector base 2, each comprising a flat base 31, and two arms 32 extended from the flat base 31 at two sides. The flat base 31 has a coupling hole 311 coupled to the upright post 22. The arms 32 each have a top end turned inwardly backwards and terminating in a retaining end piece 321. The metal column 4 is sleeved onto the upright post 22 of the connector base 2 to hold down the metal spring plates 3, comprising an axially extended center through hole 41 coupled to the upright post 22 of the connector base 2, and an inside annular flange 411 provided in the center through hole 41. The metal screw 5 is mounted in the center through hole 41 of the metal column 4 and fastened to the inside annular flange 411 of the metal column 4 and the upright post 22 of the connector body 2 to fixedly secure the metal column 4 and the metal spring plates 3 to the connector base 2. The cover plate 6 is fastened to the connector base 2 to close the crossed open chamber 21, having a plurality of bottom plug rods 61;62 respectively press-fitted into the plug holes 24;25 of the connector base 2, and a plurality of insertion holes 60 through top and bottom sidewalls thereof. When in use, the cores 11 of the cables 1 are respectively inserted through the plug holes 24;25 of the cover plate 6 into the gap in the crossed open chamber 21 between the retaining end piece 321 of each arm 32 of each of the metal spring plates 31 and each of the four peripheral sidewalls 42 of the metal column 4 (see FIGS. 5 and 6). After insertion of the cores 11 of the cables 1 into the gap in the crossed open chamber 21 between the retaining end piece 321 of each arm 32 of each of the metal spring plates 31 and each of the four peripheral sidewalls 42 of the metal column 4, the retaining end piece 321 of each arm 32 of each of the metal spring plates 31 respectively presses the core 11 of each of the cables 1 against the peripheral sidewalls 42 of the metal column 4, keeping the cores 11 of the cables 1 in close contact with the metal column 4 and preventing the cables 1 from backward movement relative to the metal column 4.

Figure 1:
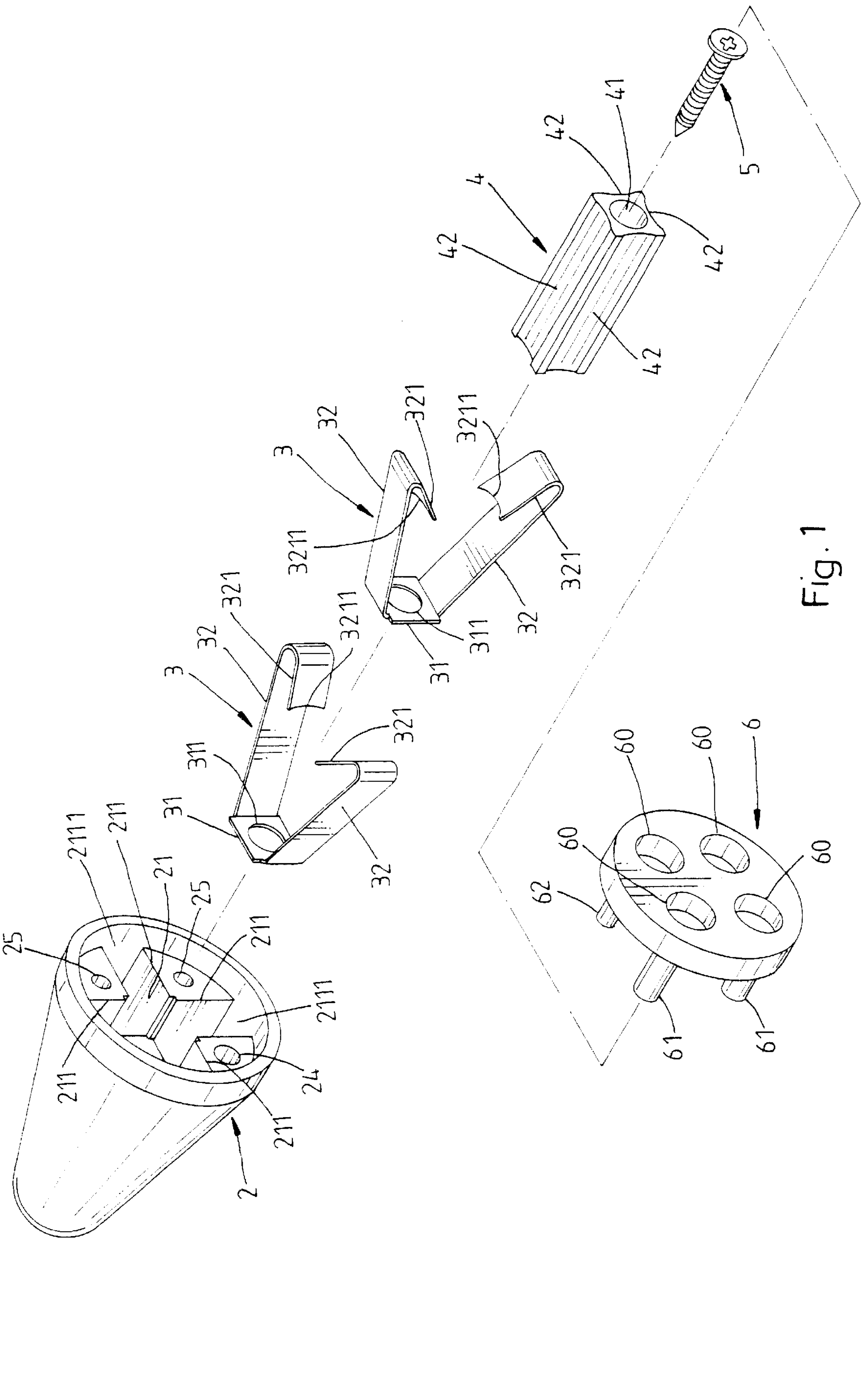
FIG. 1 is an exploded view of a one-way cable terminal connector according to the present invention.
Figure 2:
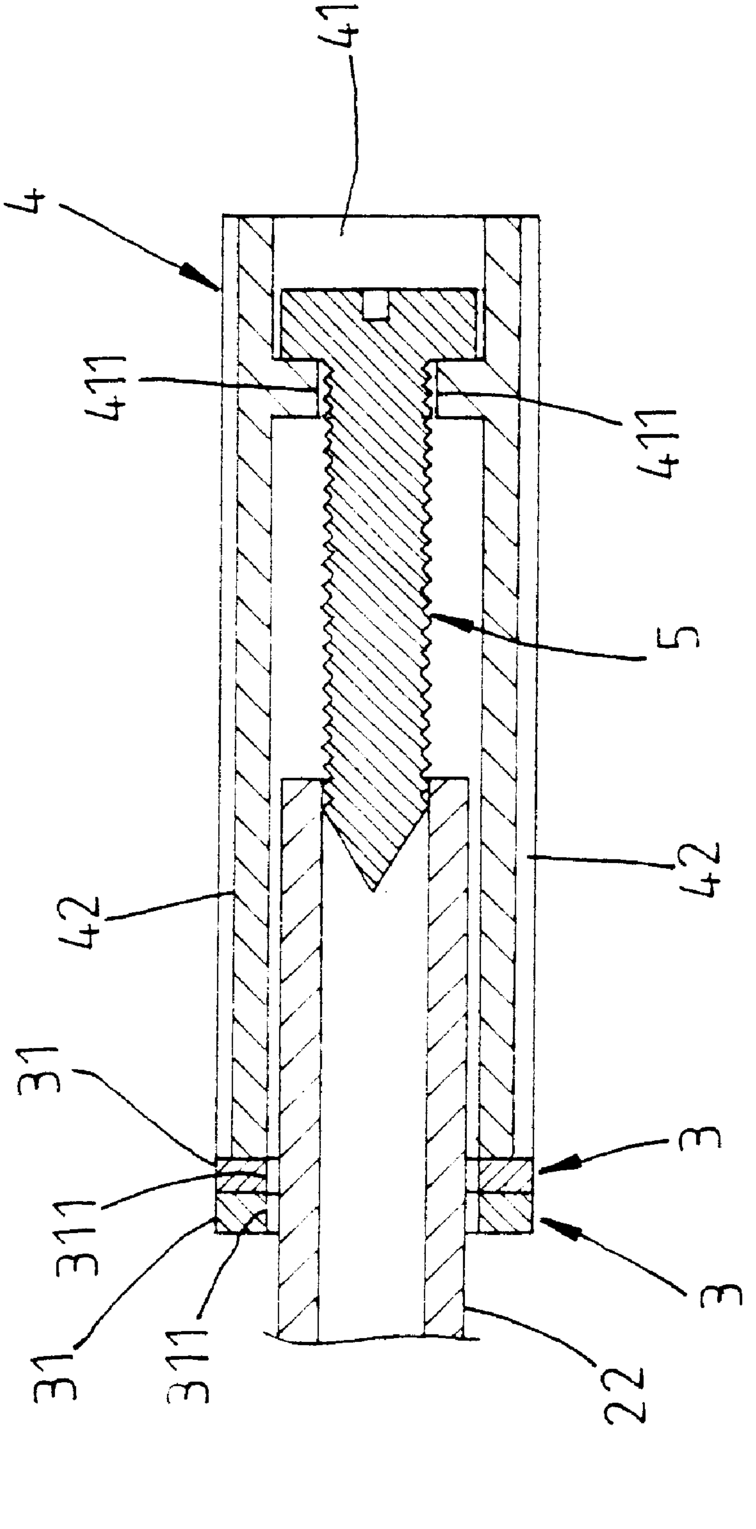
FIG. 2 is a sectional assembly view in an enlarged scale of a part of the present invention showing the metal spring plates and the metal column fastened to the upright post.
Figure 3:
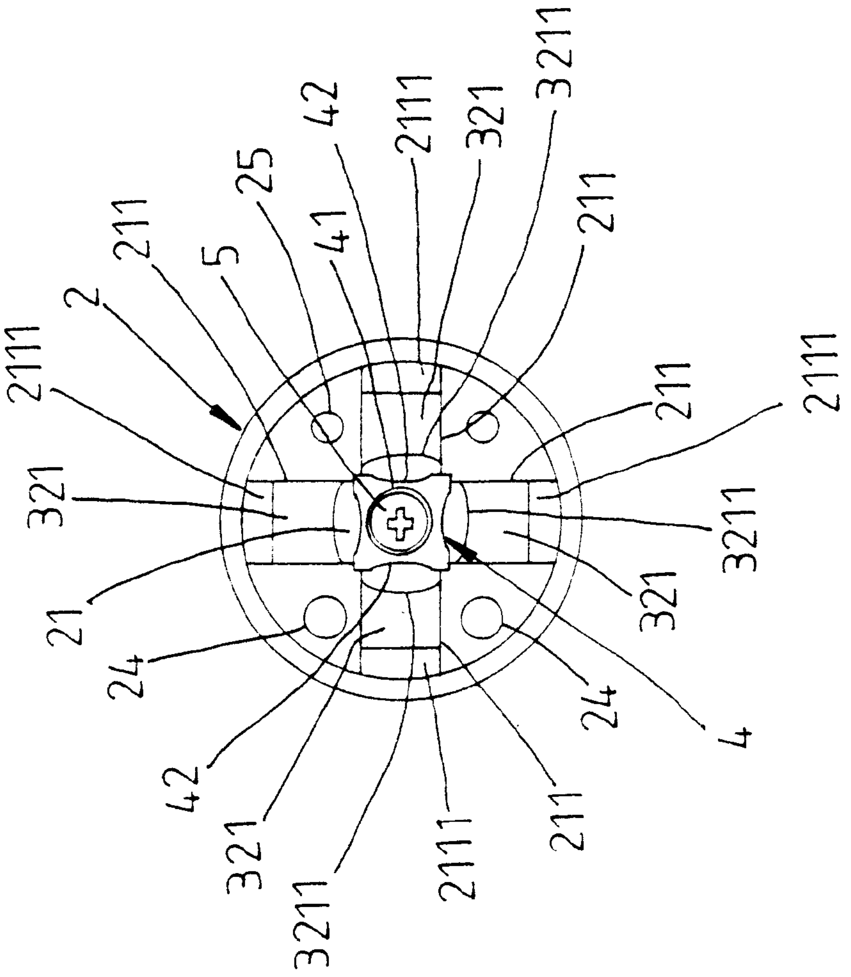
FIG. 3 is a plain view of the present invention showing the one-way cable terminal connector assembled (the cover plate excluded).
Figure 4:
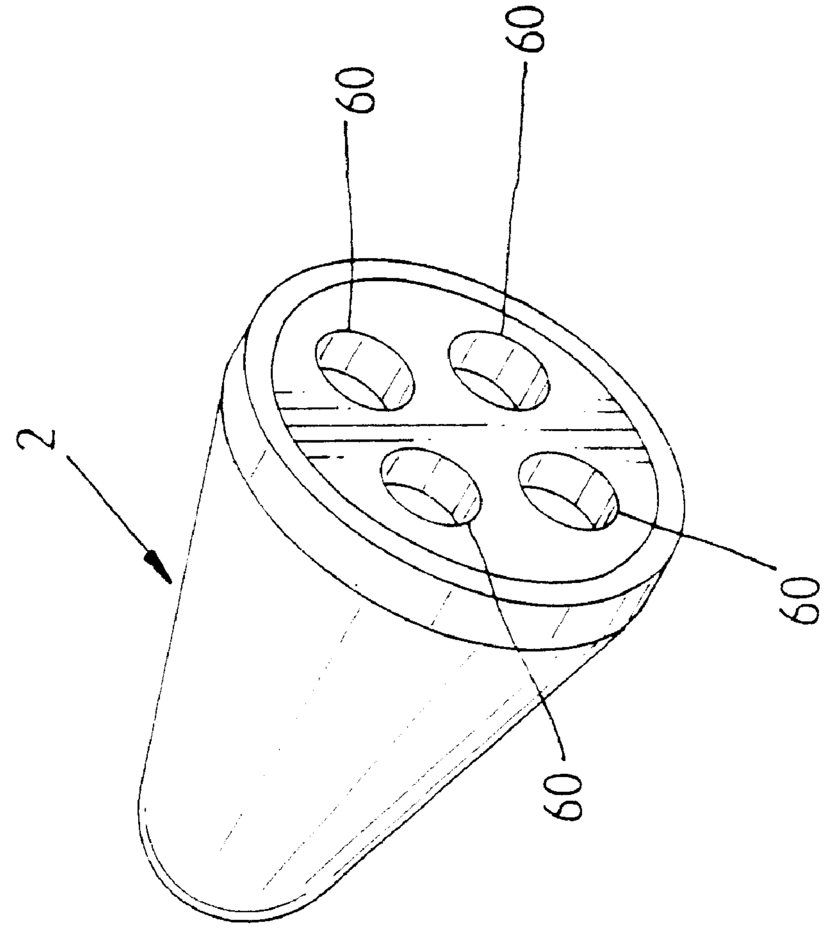
FIG. 4 is an elevational assembly view of the one-way cable terminal connector according to the present invention.

Referring to FIGS. 1 and 5 again, the peripheral sidewalls 42 of the metal column are respectively transversely curved inwards for easy insertion of the cores 11 of the cables 1 into position. The retaining end piece 321 of each arm 32 has a smoothly arched end notch 3211 fitting the periphery of the cores 11 of the cables 1 for enabling the cores 11 of the cables 1 to be conveniently inserted into position.

Figure 8:
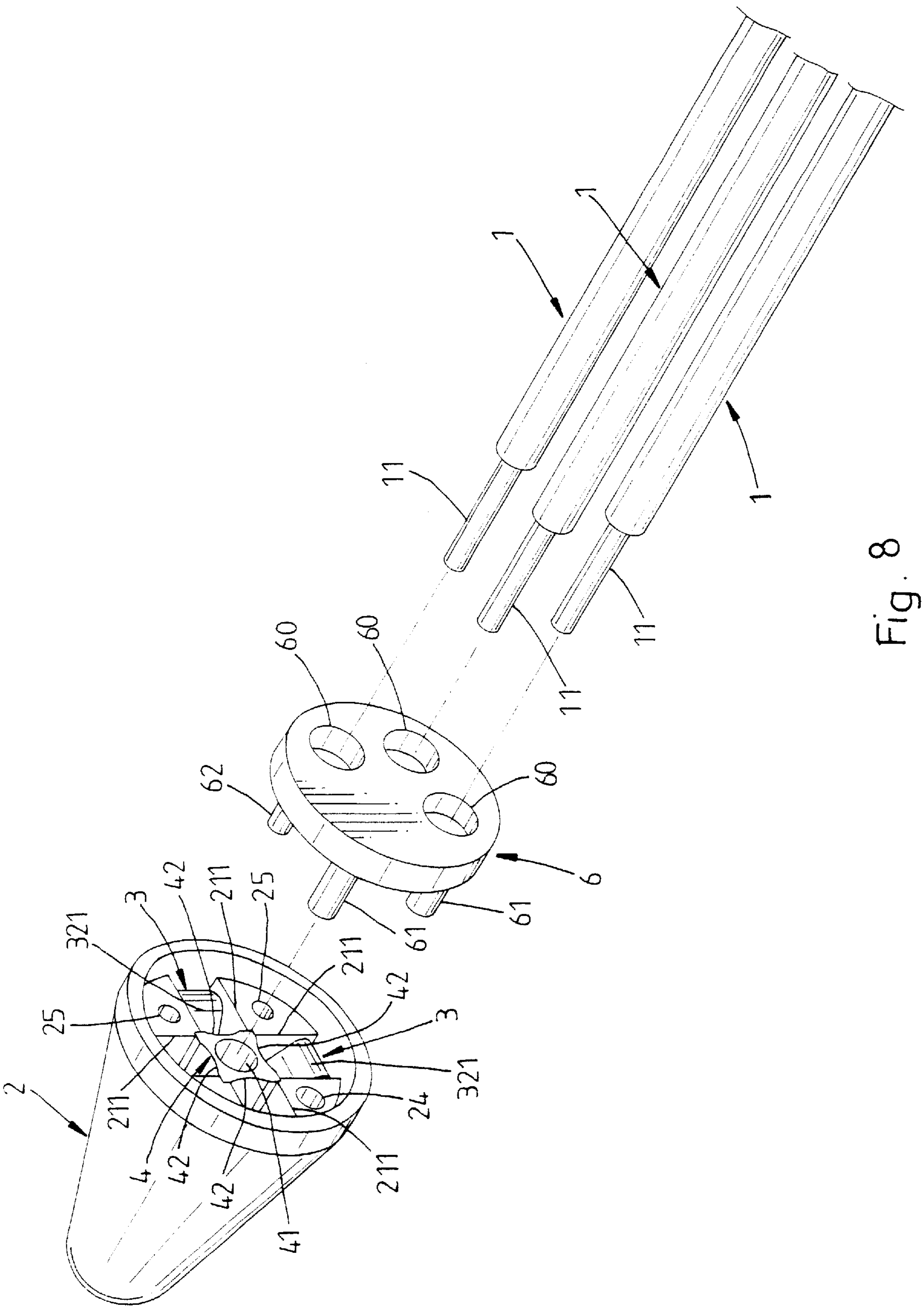
FIG. 8 is an exploded view of an alternate form of the present invention.
Figure 9:
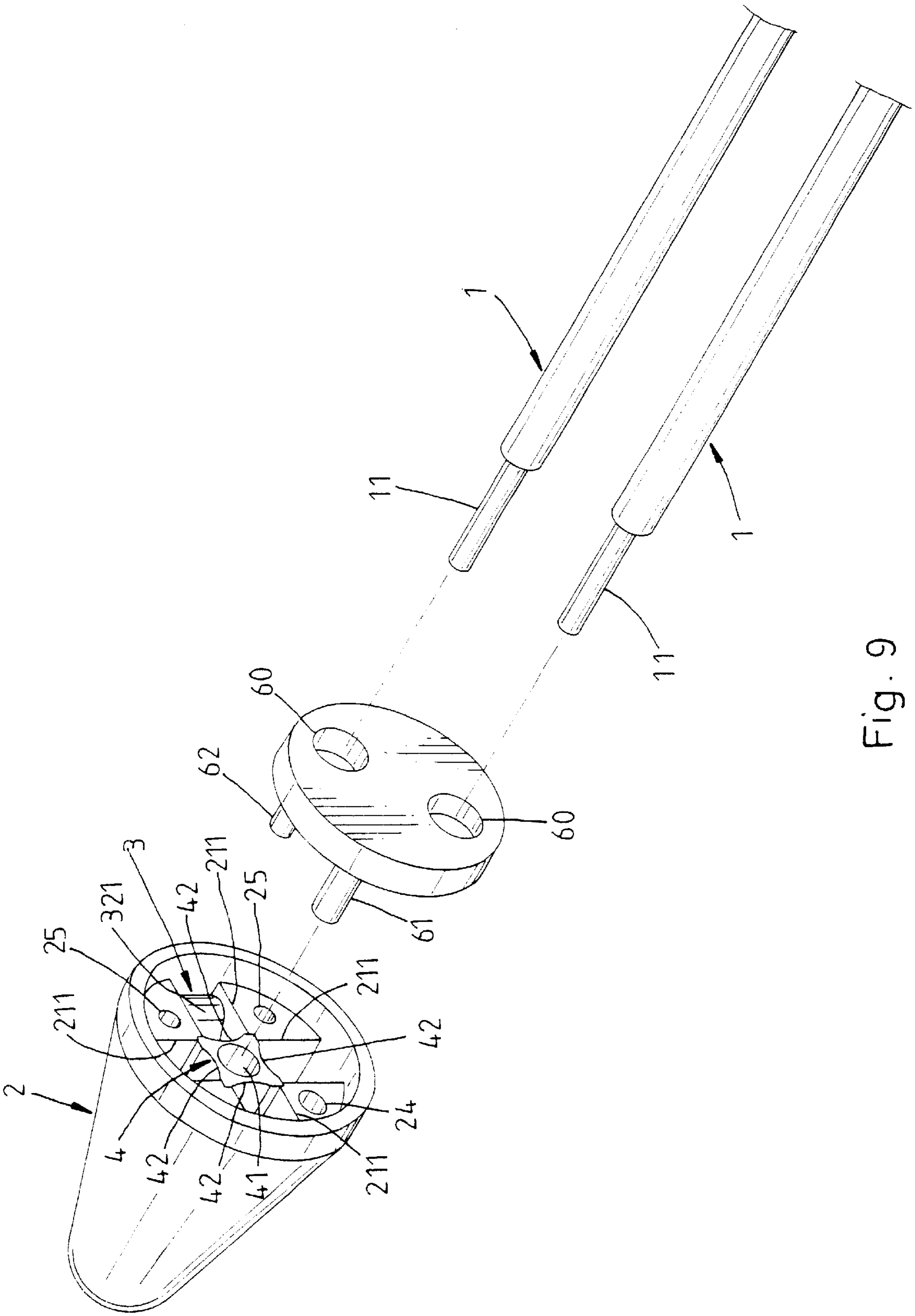
FIG. 9 is an exploded view of another alternate form of the present invention.

The one-way cable terminal connector of the invention may be various embodied to fit different installation requirements. For example, in the embodiment shown in Figures from 1 through 7, the cover plate 6 has four insertion holes 60 for the mounting of four cables 1. FIG. 8 shows an alternate form of the present invention in which the cover plate 6 has only three insertion holes 60 for the mounting of three cables 1. FIG. 9 shows another alternate form of the present invention in which the cover plate 6 has only two insertion holes 60 for the mounting of two cables 1. Furthermore, the plug holes 24;25 can be made having different diameters, and the bottom plug rods 61;62 can be made having different diameters that fit the plug holes 24;25 respectively. Because the different diameter design of the plug holes 24;25 and the plug rods 61;62 guide the installation of the cover plate 6 in the correct direction.

As indicated above, the one-way cable terminal connector of the invention has the following features:

1. The connector base 2 comprises a crossed open chamber 21 and an upright post 22 in the crossed open chamber 21 for the mounting of the V-shaped metal spring plates 3, and the metal column 4 the spring plates 3 have retaining end pieces 321 facing the peripheral sidewalls 42 of the metal column 4 for securing the cores 1 of cables 1 in close contact with the metal column 4.
2. The peripheral sidewalls 42 of the metal column 4 are respectively transversely curved inwards for guiding the insertion of the cores 11 of cables 1 into position, and the end piece 321 of each arm 32 of each metal spring plate 3 has a smoothly arched end notch 3211 adapted to guide the insertion of the core of a respective cable 1 into position.
3. The connector base 2 has plug holes 24;25 for the positioning of the cover plate 6 for dust protection, and the cover plate 6 has plug rods 61;62 fitting the plug holes 24;25 respectively and insertion holes 60 for the passing of cables 1.
4. The arrangement of the metal spring plates 3 and the metal column 4 are practical for the connection of multiple cables.

A prototype of one-way cable terminal connector has been constructed with the features of FIGS. 1~9. The one-way cable terminal connector functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A one-way cable terminal connector comprising:

a connector base, said connector base comprising a crossed open chamber formed of four spaces extended in four directions, a tapered periphery surrounding said four spaces, and an upright locating post provided at the center of said crossed open chamber;

two metal spring plates arranged at right angles and coupled to said upright post in said crossed open chamber of said connector base, said metal spring plates each comprising a flat base and two arms extended from said flat base at two sides, said flat base having a coupling hole coupled to said upright post in said crossed open chamber of said connector base, said arms each having a top end turned inwardly backwards and terminating in a retaining end piece adapted to secure the core of a cable;

a metal column sleeved onto said upright post of said connector base to hold down said metal spring plates, said metal column comprising an axially extended center through hole coupled to said upright post of said connector base, an inside annular flange provided in said center through hole, and four peripheral sidewalls respectively facing the retaining end piece of each of the arms of each of said metal spring plates for contacting and supporting the core of a respective cable against the retaining end piece of each of the arms of each of said metal spring plates; and a metal screw mounted in said center through hole of said metal column and fastened to said inside annular flange of said metal column and said upright post of said connector body to fixedly secure said metal column and said metal spring plates to said connector base.

2. The cable terminal connector as claimed in claim 1 wherein the peripheral sidewalls of said metal column are respectively transversely curved inwards.

3. The cable terminal connector as claimed in claim 1 wherein the retaining end piece of each of the arms of each of said metal spring plates has a respective smoothly arched end notch.

4. The cable terminal connector as claimed in claim 1 wherein said connector base has a plurality of plug holes and is covered with a cover plate, said cover plate comprising a plurality of bottom plug rods respectively press-fitted into said plug holes and a plurality of insertion holes through top and bottom sidewalls thereof for the insertion of a respective cable.

5. The cable terminal connector as claimed in claim 4 wherein said plug holes of said connector base have different diameters, and said bottom plug rods of said cover plate have different diameters respectively fitting the plug holes of said connector base.

* * * * *